United States Patent
Lim et al.

(10) Patent No.: US 12,548,796 B2
(45) Date of Patent: Feb. 10, 2026

(54) ADDITIVE, ELECTROLYTE FOR LITHIUM SECONDARY BATTERY COMPRISING SAME, AND LITHIUM SECONDARY BATTERY

(71) Applicant: SAMSUNG SDI CO., LTD., Yongin-si (KR)

(72) Inventors: Jin-Hyeok Lim, Yongin-si (KR); Younghye Kang, Yongin-si (KR); Dongyoung Kim, Yongin-si (KR); Soojin Kim, Yongin-si (KR); Aeran Kim, Yongin-si (KR); Suyeol Ryu, Yongin-si (KR); Jeongmin Shin, Yongin-si (KR); Kyu-Eun Shim, Yongin-si (KR); Junyong Lee, Yongin-si (KR); Tae Jin Lee, Yongin-si (KR); Myunghwan Jeong, Yongin-si (KR); Wonseok Cho, Yongin-si (KR); Olga Tsay, Yongin-si (KR); Hyunbong Choi, Yongin-si (KR); Pavel Shatunov, Yongin-si (KR); Jungmin Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 696 days.

(21) Appl. No.: 17/905,927

(22) PCT Filed: Jan. 20, 2021

(86) PCT No.: PCT/KR2021/000783
§ 371 (c)(1),
(2) Date: Sep. 8, 2022

(87) PCT Pub. No.: WO2021/182746
PCT Pub. Date: Sep. 16, 2021

(65) Prior Publication Data
US 2023/0170526 A1    Jun. 1, 2023

(30) Foreign Application Priority Data

Mar. 10, 2020 (KR) ........................ 10-2020-0029711

(51) Int. Cl.
*H01M 10/0567* (2010.01)
*H01M 4/485* (2010.01)
(Continued)

(52) U.S. Cl.
CPC ....... *H01M 10/0567* (2013.01); *H01M 4/485* (2013.01); *H01M 4/505* (2013.01);
(Continued)

(58) Field of Classification Search
CPC ...... H01M 4/485; H01M 4/505; H01M 4/525; H01M 10/052; H01M 10/0525;
(Continued)

(56) References Cited

U.S. PATENT DOCUMENTS

| 2015/0200422 A1 | 7/2015 | Lee et al. |
| 2017/0141442 A1 | 5/2017 | Mikhaylik et al. |

(Continued)

FOREIGN PATENT DOCUMENTS

| CN | 108352573 A | 7/2018 |
| CN | 110661026 A | 1/2020 |

(Continued)

OTHER PUBLICATIONS

Faure A. and Descotes, G. Synthesis of O, S-Alkanediyl S, S-Dimethyl Trithioorthocarbonates by Thermolysis of O, O'-Alkanediyl S, S'-Dimethyl Bis-dithiocarbonates. Synthesis. 1978; 1978(04):286-8. Pag. 286; par. 2 and 3 and pag. 287; Table 1 (Year: 1978).*

(Continued)

*Primary Examiner* — Nicole M. Buie-Hatcher
*Assistant Examiner* — Gilberto Ramos Rivera
(74) *Attorney, Agent, or Firm* — Womble Bond Dickinson (US) LLP

(57) ABSTRACT

Provided are an additive represented by Chemical Formula 1, an electrolyte for a lithium secondary battery including same, and a lithium secondary battery. The details of Chemical Formula 1 are as described in the specification.

11 Claims, 3 Drawing Sheets

(51) Int. Cl.
  *H01M 4/505* (2010.01)
  *H01M 4/525* (2010.01)
  *H01M 10/0525* (2010.01)
  *H01M 4/02* (2006.01)

(52) U.S. Cl.
  CPC ....... *H01M 4/525* (2013.01); *H01M 10/0525* (2013.01); *H01M 2004/028* (2013.01); *H01M 2300/0025* (2013.01)

(58) Field of Classification Search
  CPC ....... H01M 10/0567; H01M 2004/028; H01M 2300/0025; Y02E 60/10
  USPC ........................................................ 429/188
  See application file for complete search history.

(56) References Cited

U.S. PATENT DOCUMENTS

| | | |
|---|---|---|
| 2017/0294648 A1 | 10/2017 | Burshtain et al. |
| 2018/0351158 A1 | 12/2018 | Liao et al. |
| 2019/0198912 A1 | 6/2019 | Sella et al. |
| 2020/0006810 A1 | 1/2020 | Lee et al. |

FOREIGN PATENT DOCUMENTS

| | | | |
|---|---|---|---|
| EP | 3404748 A1 * | 11/2018 | .......... H01M 10/052 |
| JP | 2010-135165 A | 6/2010 | |
| JP | 2014-032781 A | 2/2014 | |
| JP | 2018-533823 A | 11/2018 | |
| JP | 2019-511103 A | 4/2019 | |
| KR | 10-2015-0085670 A | 7/2015 | |
| KR | 10-2018-0071377 A | 6/2018 | |
| KR | 10-2020-0000446 A | 1/2020 | |
| WO | 2018/213661 A2 | 11/2018 | |

OTHER PUBLICATIONS

Japanese Office Action dated Sep. 19, 2023, issued in corresponding Japanese Patent Application No. 2022-550827 (5 pages).

International Search Report of PCT/KR2021/000783, Apr. 28, 2021, 6 pp.

Faure, Alain, et al., "Synthesis of O,S-Alkanediyl S,S-Dimethyl Trithioorthocarbonates by Thermolysis of O,O'-Alkanediyl S,S'-Dimethyl Bis-dithiocarbonates," Synthesis, 1978, pp. 286-288.

Korean Office Action, with English translation, dated Jan. 25, 2023, issued in corresponding Korean Patent Application No. 10-2020-0029711 (11 pages).

Chinese Office Action for CN Application 202180017815.9, dated Mar. 29, 2025, 12 pages.

* cited by examiner

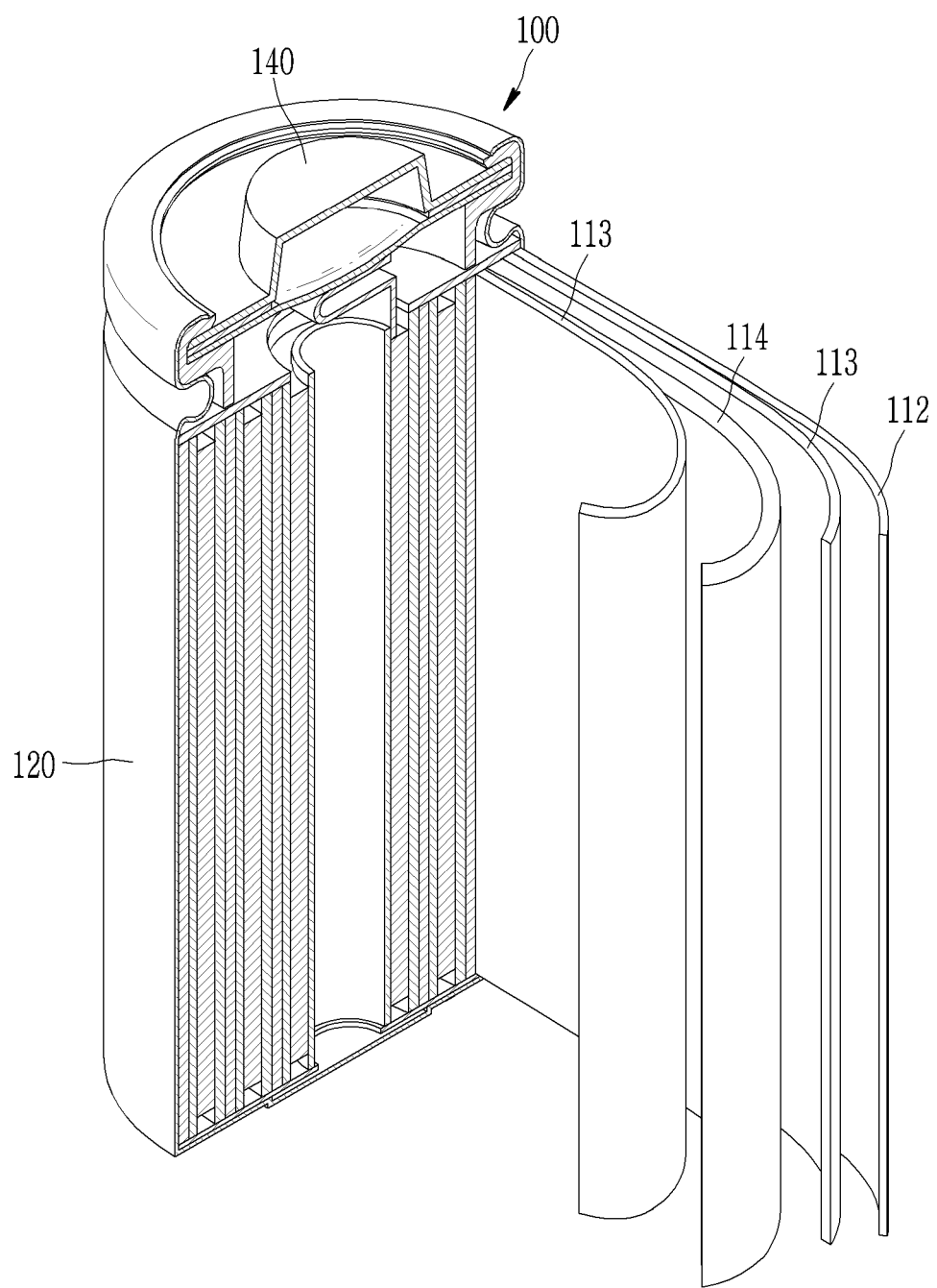
[Figure 1]

[Figure 2]
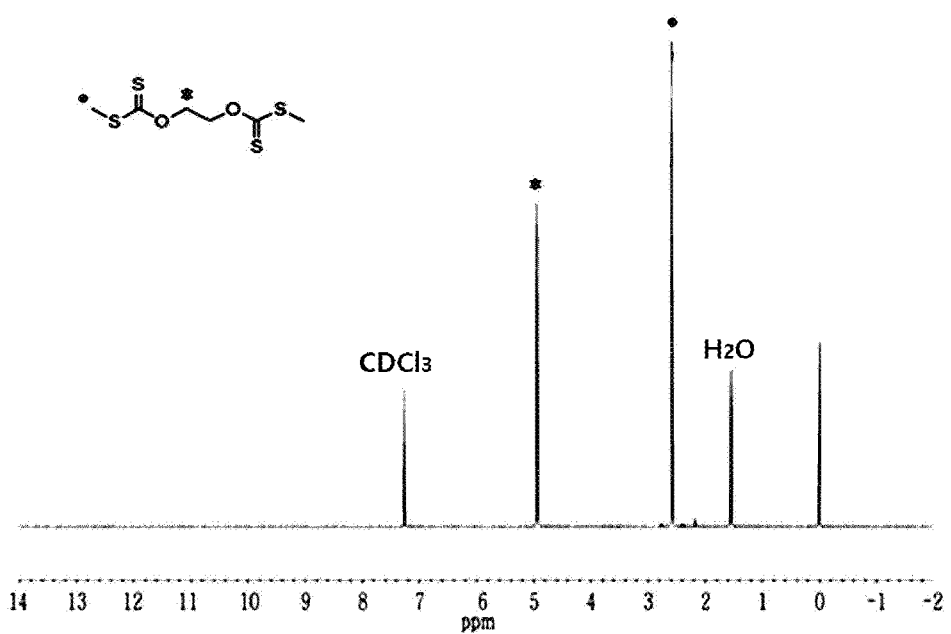

[Figure 3]
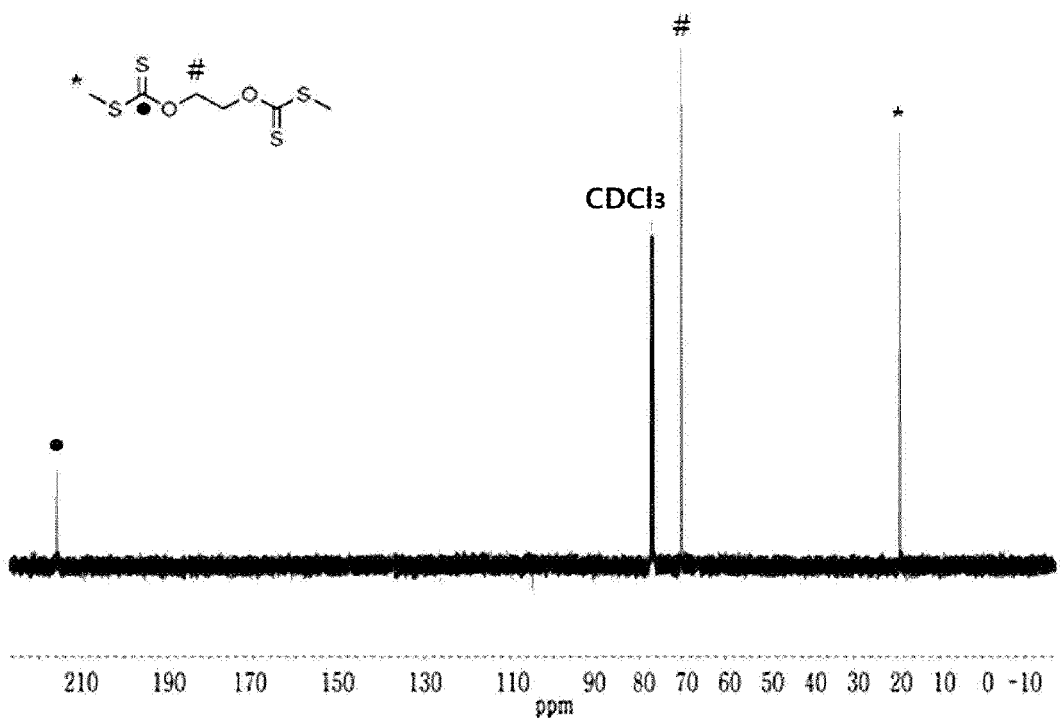

ADDITIVE, ELECTROLYTE FOR LITHIUM SECONDARY BATTERY COMPRISING SAME, AND LITHIUM SECONDARY BATTERY

CROSS-REFERENCE TO RELATED APPLICATIONS

This application is a U.S. National Phase Patent Application of International Application Number PCT/KR2021/000783, filed on Jan. 20, 2021, which claims priority of Korean Patent Application Number 10-2020-0029711, filed on Mar. 10, 2020, the entire content of each of which is incorporated herein by reference.

TECHNICAL FIELD

An additive, an electrolyte for a lithium secondary battery including the same, and lithium secondary battery are disclosed.

BACKGROUND ART

A lithium secondary battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a lithium secondary battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

Particularly, an electrolyte includes an organic solvent in which a lithium salt is dissolved and critically determines stability and performance of a lithium secondary battery.

$LiPF_6$ that is most commonly used as a lithium salt of an electrolyte has a problem of reacting with an electrolytic solvent to promote depletion of a solvent and generate a large amount of gas. When $LiPF_6$ is decomposed, it generates LiF and $PF_5$, which leads to electrolyte depletion in the battery, resulting in degradation in high-temperature performance and poor safety.

There are needs for an electrolyte which suppresses side reactions of such a lithium salt and improves the performance of the battery.

DISCLOSURE

Technical Problem

An embodiment provides an electrolyte for a lithium secondary battery capable of capable of improving high-temperature cycle-life characteristics of a lithium secondary battery.

Another embodiment provides an electrolyte for a lithium secondary battery including the additive.

Another embodiment provides a lithium secondary battery including the electrolyte for a lithium secondary battery.

Technical Solution

An embodiment of the present invention provides an additive represented by Chemical Formula 1.

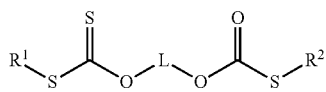

[Chemical Formula 1]

In Chemical Formula 1, $R^1$ and $R^2$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, and L is a substituted or unsubstituted C1 to C10 alkylene group.

As an example, Chemical Formula 1 may be represented by Chemical Formula 1-1.

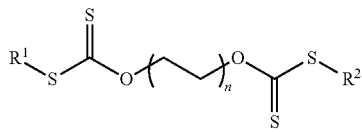

[Chemical Formula 1-1]

In Chemical Formula 1-1, n is one of integers from 1 to 5, and the definitions of $R^1$ and $R^2$ are as described above.

As a specific example, $R^1$ and $R^2$ in Chemical Formula 1 may each independently be a substituted or unsubstituted C1 to C10 alkyl group, a substituted or unsubstituted C2 to C10 alkenyl group, or a substituted or unsubstituted C6 to C20 aryl group.

As a more specific example, $R^1$ and $R^2$ in Chemical Formula 1 may each independently be a substituted or unsubstituted C1 to C10 alkyl group or a substituted or unsubstituted C2 to C10 alkenyl group.

For example, $R^1$ and $R^2$ in Chemical Formula 1 may each independently be a substituted or unsubstituted C1 to C5 alkyl group.

In an embodiment, $R^1$ and $R^2$ in Chemical Formula 1 may be the same.

Another embodiment of the present invention provides an electrolyte for a lithium secondary battery including a non-aqueous organic solvent, a lithium salt, and the aforementioned additive.

The additive may be included in an amount of 0.1 wt % to 10 wt % based on the total weight of the electrolyte for a lithium secondary battery.

As a specific example, the additive may be included in an amount of 0.1 wt % to 3.0 wt % based on the total weight of the electrolyte for a lithium secondary battery.

Another embodiment of the present invention provides a lithium secondary battery including a positive electrode including a positive active material; a negative electrode including a negative active material; and the aforementioned electrolyte.

The positive active material may be a composite oxide of a nickel-containing metal and lithium.

The positive active material may be, for example, represented by Chemical Formula 4.

$$Li_aM^1{}_{1-y1-z1}M^2{}_{y1}M^3{}_{z1}O_2$$ [Chemical Formula 4]

In Chemical Formula 4,
0.9≤a≤1.8, 0≤y1≤1, 0≤z1≤1, 0≤y1+z1<1, $M^1$, $M^2$, and $M^3$ may each independently be selected from metals such as Ni, Co, Mn, Al, Sr, Mg, or La, and a combination thereof.

Advantageous Effects

A lithium secondary battery with improved high-temperature cycle-life characteristics may be implemented.

DESCRIPTION OF THE DRAWINGS

FIG. 1 is a schematic view illustrating a lithium secondary battery according to an embodiment of the present invention.

FIG. 2 is a 1H NMR spectrum of a compound synthesized as an additive according to an embodiment of the present invention.

FIG. 3 is a 13C NMR spectrum of a compound synthesized as an additive according to an embodiment of the present invention.

DESCRIPTION OF SYMBOLS

100: lithium secondary battery
112: negative electrode
113: separator
114: positive electrode
120: battery case
140: sealing member

MODE FOR INVENTION

Hereinafter, embodiments of the present disclosure are illustrated in detail. However, these embodiments are exemplary, the present invention is not limited thereto and the present invention is defined by the scope of claims.

As used herein, when a definition is not otherwise provided, 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an additive according to an embodiment is described.

The additive according to an embodiment of the present invention is represented by Chemical Formula 1.

[Chemical Formula 1]

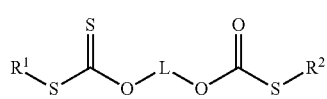

In Chemical Formula 1,
$R^1$ and $R^2$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, and L is a substituted or unsubstituted C1 to C10 alkylene group.

The additive according to an embodiment of the present invention includes a dithioester functional group, which forms a film on each surface of positive and negative electrodes in an electrolyte solution to suppress a resistance increase in the film when stored at a high temperature and thus exhibits an effect of improving cycle-life characteristics.

Particularly, a thio carbonyl group (=S) included in the dithioester functional group may form a stronger film than a carbonyl group (=O), which is a film with excellent heat resistance, thereby, improving high-temperature characteristics of a battery manufactured by using the additive including the dithioester functional group represented by Chemical Formula 1.

As an example, the additive may be represented by Chemical Formula 1-1.

[Chemical Formula 1-1]

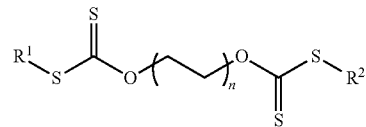

In Chemical Formula 1-1, n is one of integers from 1 to 5, and
the definitions of $R^1$ and $R^2$ are as described above.

The additive according to an embodiment may have a structure that two dithioester functional groups are linked by a dioxyalkylene group having an even number of carbons as shown in Chemical Formula 1-1.

The additive having such a structure induces stabilization of the positive electrode by binding ligands with transition metals, as the two thio carbonyl groups may function as a scavenger optimized for the intermetallic geometric structure of the positive active material on the surface of the positive electrode and thereby, prevents decomposition of the positive electrode, resultantly reducing a resistance increase rate in a lithium secondary battery.

For example, $R^1$ and $R^2$ may each independently be a substituted or unsubstituted C1 to C10 alkyl group, a substituted or unsubstituted C2 to C10 alkenyl group, or a substituted or unsubstituted C6 to C20 aryl group.

In a specific example, $R^1$ and $R^2$ may each independently be a substituted or unsubstituted C1 to C10 alkyl group or a substituted or unsubstituted C2 to C10 alkenyl group.

For example, $R^1$ and $R^2$ may each independently be a substituted or unsubstituted C1 to C5 alkyl group.

In an embodiment, $R^1$ and $R^2$ may be the same.

When $R^1$ and $R^2$ are the same substituents and have a symmetric structure, the additive has a structure that can be more suitably coordinated to a geometry of the positive active material, thereby further maximizing the positive electrode stabilization effect.

The electrolyte for a lithium secondary battery according to another embodiment of the present invention includes a non-aqueous organic solvent, a lithium salt, and the aforementioned additive.

The additive may be included in an amount of 0.1 wt % to 10 wt %, specifically 0.1 wt % to 5.0 wt %, and more specifically 0.1 wt % to 3.0 wt % based on the total weight of the electrolyte for a lithium secondary battery.

When the content range of the additive is as described above, an increase in resistance at high temperatures may be prevented and thereby a lithium secondary battery with improved cycle-life characteristics may be implemented.

That is, when the content of the additive is less than 0.1 wt %, storage characteristics at a high temperature may be lowered, and when it exceeds 10 wt %, cycle-life may be reduced due to an increase in interfacial resistance.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, t-butyl acetate, methyl propionate, ethylpropionate, propylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may include cyclohexanone, and the like. The alcohol-based solvent may include ethanol, isopropyl alcohol, and the like and the aprotic solvent may include nitriles such as R—CN (wherein R is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture. When the organic solvent is used in a mixture, a mixture ratio may be controlled in accordance with a desirable battery performance.

The carbonate-based solvent is prepared by mixing a cyclic carbonate and a chain carbonate. When the cyclic carbonate and chain carbonate are mixed together in a volume ratio of 1:1 to 1:9, an electrolyte performance may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

[Chemical Formula 2]

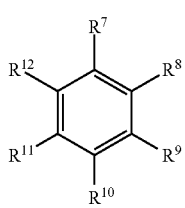

In Chemical Formula 2, $R^7$ to $R^{12}$ are the same or different and are selected from hydrogen, a halogen, C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 3 in order to improve cycle-life of a battery.

[Chemical Formula 3]

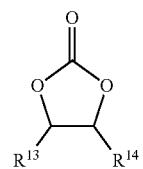

In Chemical Formula 3, $R^{13}$ and $R^{14}$ are the same or different and selected from hydrogen, a halogen, a cyano group (CN), a nitro group ($NO_2$), and a fluorinated C11 to C5 alkyl group, provided that at least one of $R^{13}$ and $R^{14}$ is a halogen, a cyano group (CN), a nitro group ($NO_2$), and a fluorinated C1 to C5 alkyl group and $R^{13}$ and $R^{14}$ are not simultaneously hydrogen.

Examples of the ethylene-based carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent supplies lithium ions in a battery, enables a basic operation of a lithium secondary battery, and improves transportation of the lithium ions between positive and negative electrodes. Examples of the lithium salt include at least one selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI, and $LiB(C_2O_4)_2$ (lithium bis(oxalato) borate: LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including a positive electrode including a positive active material; a negative electrode including a negative active material; and the aforementioned electrolyte.

The positive electrode includes a current collector and a positive active material layer disposed on the current collector and including a positive active material.

The positive active material may include lithiated intercalation compounds that reversibly intercalate and deintercalate lithium ions.

Specifically, a composite oxide of a nickel-containing metal and lithium can be used.

Examples of the positive active material may include a compound represented by any one of the following chemical formulas.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b<0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method (e.g., spray coating, dipping, etc.), but is not illustrated in more detail since it is well-known to those skilled in the related field.

More specifically, at least one type of lithium composite oxide represented by Chemical Formula 4 may be used.

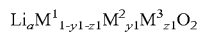    [Chemical Formula 4]

In Chemical Formula 4,
0.9≤a≤1.8, 0≤y1≤1, 0≤z1≤, 0≤y1+z1<1, $M^1$, $M^2$, and $M^3$ may each independently be selected from metals such as Ni, Co, Mn, Al, Sr, Mg, or La, and a combination thereof.

For example, $M^1$ may be Ni, and $M^2$ and $M^3$ may each independently be a metal such as Co, Mn, Al, Sr, Mg, or La.

More specifically, $M^1$ may be Ni, $M^2$ may be Co, and $M^3$ may be Mn or Al, but they are not limited thereto.

Specific examples of the positive active material according to the embodiment of the present invention include $Li_xNi_yCo_zAl_{1-y-z}O_2$ (1≤x≤1.2, 0.5≤y≤1, and 0≤z≤0.5).

The positive active material may be included in an amount of 90 wt % to 98 wt % based on the total weight of the positive active material layer.

In an embodiment of the present invention, the positive active material layer may include a binder and a conductive material. Herein, the binder and the conductive material may be included in an amount of 1 wt % to 5 wt %, respectively based on the total amount of the positive active material layer.

The binder plays a role of adhering positive active material particles one another and in addition, the positive active material particles to a current collector, and examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity, any electrically conductive material may be used as a conductive material unless it causes a chemical change, and examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al but is not limited thereto.

The negative electrode includes a current collector and a negative active material layer formed on the current collector and including a negative active material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include a carbon material. The carbon material may be any generally-used carbon-based negative active material in a lithium ion secondary battery. Examples thereof may be crystalline carbon, amorphous carbon, or a mixture thereof. The crystalline carbon may be non-shaped, or sheet, flake, spherical, or fiber-shaped natural graphite or artificial graphite. The amorphous carbon may be a soft carbon, a hard carbon, a mesophase pitch carbonization product, calcined coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, Si—C composite, $SiO_x$ (0<x<2), a Si-Q alloy wherein Q is an element selected from an alkali metal, an alkaline-earth metal, a Group 13 element, a Group 14 element, a Group 15 element, a Group 16 element, a transition metal, a rare earth element, and a combination thereof, but not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of 95 wt % to 99 wt % based on the total weight of the negative active material layer.

In an embodiment of the present disclosure, the negative active material layer includes a binder, and optionally a conductive material. In the negative active material layer, a content of the binder may be 1 wt % to 5 wt % based on the total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may be polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, ethylenepropylene copolymer, polyethyleneoxide, polyvinylpyrrolidone, polyepichlorohydrine, polyphosphazene, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose-based compound as a thickener may be further used to provide viscosity. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 to 3 parts by weight based on 100 parts by weight of the negative active material.

The conductive material is included to provide electrode conductivity, any electrically conductive material may be used as a conductive material unless it causes a chemical change, and examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The lithium secondary battery may further include a separator between the negative electrode and the positive electrode, depending on a type of the lithium secondary battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Referring to FIG. 1, a lithium secondary battery 100 according to an embodiment includes a battery cell including a negative electrode 112, a positive electrode 114 facing the negative electrode 112, a separator 113 interposed between the negative electrode 112 and the positive electrode 114, and an electrolyte 113 (not shown) for a lithium secondary battery impregnating the negative electrode 112, the positive electrode 114, and the separator 113, a battery case 120 housing the battery cell, and a sealing member 140 sealing the battery case 120.

DETAILED DESCRIPTION OF THE EMBODIMENTS

Hereinafter, examples of the present invention and comparative examples are described. These examples, however, are not in any sense to be interpreted as limiting the scope of the invention.

Manufacture of Lithium Secondary Battery Cell

Preparation Example: Synthesis of Compound Represented by Chemical Formula a (Carbonodithioic Acid, O, O'-1,2-Ethanediyl-S, S'-Dimethyl Ester (9CI))

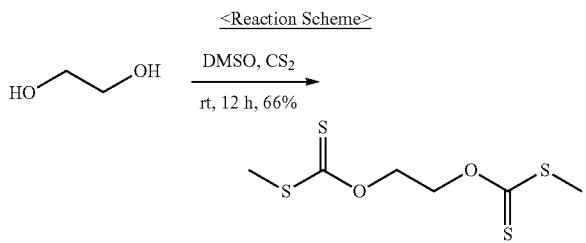

Ethylene glycol (1.0 eq) was dissolved in DMSO and then, added to in a dropwise fashion to carbon disulfide (1.2 eq) at room temperature and then, stirred for 12 hours. When a reaction was completed, water was added to the reaction mixture and then, extracted, separating an organic layer. The collected organic layer was dried with $MgSO_4$ and filtered, and an filtrate therefrom was concentrated and then, recrystallized in n-hexane/benzene, obtaining light yellow solid (Yield=66%).

Whether or not the compound was synthesized was checked from 1H NMR and 13C NMR spectra shown in FIGS. 2 and 3.

FIG. 2 is a 1H NMR spectrum of a compound synthesized as an additive according to an embodiment of the present invention.

FIG. 3 is a 13C NMR spectrum of a compound synthesized as an additive according to an embodiment of the present invention.

Referring to FIGS. 2 and 3, information on specific peaks in the NMR spectrum is as follows.

Example 1

$LiNi_{0.88}Co_{0.105}Al_{0.015}O_2$ as a positive active material, polyvinylidene fluoride as a binder, and a carbon black as a conductive material were mixed in a weight ratio of 97:1.6:1.4 and then, dispersed in N-methyl pyrrolidone, preparing positive active material slurry.

The positive active material slurry was coated on a 20 µm-thick Al foil and dried at 100° C. and pressed, manufacturing a positive electrode.

Negative active material slurry was prepared by mixing graphite as a negative active material, a styrene-butadiene rubber binder, and carboxylmethyl cellulose in a weight ratio of 98:1:1 and dispersing the mixture in distilled water.

The negative active material slurry was coated on a 10 µm-thick Cu foil and then, dried at 100° C. and pressed, manufacturing a negative electrode.

The positive electrode, the negative electrode, a 25 µm-thick separator made of a polyethylene material, and an electrolyte solution were used to manufacture a lithium secondary battery cell.

The electrolyte has a following composition.
(Composition of Electrolyte)
Salt: $LiPF_6$ 1.5 µM
Solvent: ethylene carbonate: ethylmethyl carbonate: dimethyl carbonate (EC:EMC:DMC=volume ratio of 2:1:7)
Additive: compound represented by Chemical Formula a, 0.1 wt %
(Herein, in the composition of the electrolyte, "wt %" is based on the total amount of an electrolyte (a lithium salt+a non-aqueous organic solvent+an additive))

Example 2

A lithium secondary battery cell was manufactured in the same manner as in Example 1 except that the content of the additive was changed into 0.5 wt %.

Example 3

A lithium secondary battery cell was manufactured in the same manner as in Example 1 except that the content of the additive was changed into 1.0 wt %.

Example 4

A lithium secondary battery cell was manufactured in the same manner as in Example 1 except that the content of the additive was changed into 2.0 wt %.

Example 5

A lithium secondary battery cell was manufactured in the same manner as in Example 1 except that the content of the additive was changed into 3.0 wt %.

Comparative Example 1

A lithium secondary battery cell was manufactured in the same manner as in Example 1 except that the additive was not used.

Comparative Example 2

A lithium secondary battery cell was manufactured in the same manner as in Example 1 except that the additive was changed into a compound represented by Chemical Formula b.

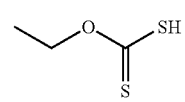
[Chemical Formula b]

(ethyl xanthate ($C_3H_6OS_2$), ethoxymethanedithioic acid, CAS 151-01-9)

Comparative Examples 3 to 5

Lithium secondary battery cells were manufactured in the same manner as in Example 1 except that the content of the additive was respectively changed into 0.5 wt %, 2.0 wt %, and 3.0 wt %.

Evaluation: Evaluation of High-Temperature Cycle-Life Characteristics

The lithium secondary battery cells according to Examples 1 to 5 and Comparative Examples 1 to 5 were 150 times charged at a constant current-constant voltage of 0.5 C and 4.3 V under a cut-off condition of 0.05 C and discharged at a constant current of 0.5 C under a cut-off condition of 2.8 V at 45° C. and then, measured with respect to capacity ratios (capacity retentions) of discharge capacity at the 150th cycles to discharge capacity at the 1st cycle, which are shown in Table 1.

TABLE 1

|  | Additive | Content of additive | capacity retention after 150 cycle (@ 45° C., %) |
| --- | --- | --- | --- |
| Example 1 | Chemical Formula a | 0.1 | 92.5 |
| Example 2 | Chemical Formula a | 0.5 | 92.9 |
| Example 3 | Chemical Formula a | 1.0 | 93.8 |
| Example 4 | Chemical Formula a | 2.0 | 93.4 |
| Example 5 | Chemical Formula a | 3.0 | 92.5 |
| Comparative Example 1 | — | 0 | 91.7 |
| Comparative Example 2 | Chemical Formula b | 0.1 | 90.5 |
| Comparative Example 3 | Chemical Formula b | 0.5 | 89.8 |
| Comparative Example 4 | Chemical Formula b | 2.0 | 89.6 |
| Comparative Example 5 | Chemical Formula b | 3.0 | 87.8 |

Referring to Table 1, the lithium secondary battery cells according to Examples 1 to 5, compared with the lithium secondary battery cell including no additive according to Comparative Example 1 and the lithium secondary battery cells including the additive represented by Chemical Formula b according to Comparative Examples 2 to 5, exhibited improved capacity deterioration and thus improved high-temperature cycle-life characteristics.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. An electrolyte for a lithium secondary battery comprising:
   a non-aqueous organic solvent,
   a lithium salt, and
   an additive represented by Chemical Formula 1:

[Chemical Formula 1]

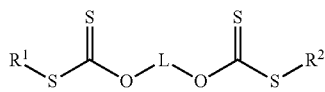

wherein, in Chemical Formula 1,
   $R^1$ and $R^2$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, and
   L is a substituted or unsubstituted C1 to C10 alkylene group.

2. The electrolyte for a lithium secondary battery of claim 1, wherein
   Chemical Formula 1 is represented by Chemical Formula 1-1:

[Chemical Formula 1-1]

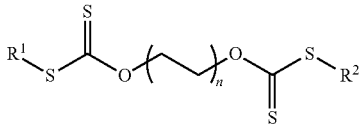

wherein, in Chemical Formula 1-1,
   n is one of integers from 1 to 5, and
   the definitions of $R^1$ and $R^2$ are as claim 1.

3. The electrolyte for a lithium secondary battery of claim 1, wherein
   $R^1$ and $R^2$ in Chemical Formula 1 are each independently a substituted or unsubstituted C1 to C10 alkyl group, a substituted or unsubstituted C2 to C10 alkenyl group, or a substituted or unsubstituted C6 to C20 aryl group.

4. The electrolyte for a lithium secondary battery of claim 1, wherein
   $R^1$ and $R^2$ in Chemical Formula 1 are each independently a substituted or unsubstituted C1 to C10 alkyl group or a substituted or unsubstituted C2 to C10 alkenyl group.

5. The electrolyte for a lithium secondary battery of claim 1, wherein
   $R^1$ and $R^2$ in Chemical Formula 1 are each independently a substituted or unsubstituted C1 to $C_5$ alkyl group.

6. The electrolyte for a lithium secondary battery of claim 1, wherein
   $R^1$ and $R^2$ in Chemical Formula 1 are the same.

7. The electrolyte for a lithium secondary battery of claim 1, wherein
   the additive is included in an amount of 0.1 wt % to 10 wt % based on the total weight of the electrolyte for a lithium secondary battery.

8. The electrolyte for a lithium secondary battery of claim 1, wherein
   the additive is included in an amount of 0.1 wt % to 3.0 wt % based on the total weight of the electrolyte for a lithium secondary battery.

9. A lithium secondary battery, comprising
   a positive electrode including a positive active material;
   a negative electrode including a negative active material;
   the electrolyte of claim 1.

10. The lithium secondary battery of claim 9, wherein
    the positive active material is a composite oxide of a nickel-containing metal and lithium.

11. The lithium secondary battery of claim 9, wherein
    the positive active material is represented by Chemical Formula 4:

[Chemical Formula 4]

$Li_aM^1{}_{1-y1-z1}M^2{}_{y1}M^3{}_{z1}O_2$ wherein, in Chemical Formula 4,
    $0.9 \le a \le 1.8$, $0 \le y1 \le 1$, $0 \le z1 \le 1$, $0 \le y1+z1 < 1$, $M^1$, $M^2$, and $M^3$ may each independently be selected from metals of Ni, Co, Mn, Al, Sr, Mg, or La, and a combination thereof.

* * * * *